United States Patent [19]

Brown

[11] 4,407,343
[45] Oct. 4, 1983

[54] TREE FELLER WITH GRAVITATIONAL BUNCHER

[75] Inventor: Harry E. Brown, Perry, Fla.

[73] Assignee: The Buckeye Cellulose Corporation, Cincinnati, Ohio

[21] Appl. No.: 408,372

[22] Filed: Jun. 2, 1982

Related U.S. Application Data

[63] Continuation of Ser. No. 99,242, Dec. 3, 1979, abandoned.

[51] Int. Cl.³ .............................................. A01G 23/08
[52] U.S. Cl. .................................. 144/34 E; 56/13.9; 83/928; 144/339; 144/3 D
[58] Field of Search ................ 83/928; 144/2 Z, 3 D, 144/34 R, 34 E, 335, 336, 339; 56/13.9

[56] References Cited

U.S. PATENT DOCUMENTS

| | | | |
|---|---|---|---|
| 3,230,988 | 1/1966 | Dixon | 144/34 E |
| 3,468,352 | 9/1969 | Larson | 144/3 D |
| 3,528,468 | 9/1970 | Blonsky | 144/34 E |
| 3,581,786 | 6/1971 | Rigoni | 144/339 |
| 3,646,975 | 3/1972 | McNeil, Sr. et al. | 144/339 |
| 3,665,985 | 5/1972 | White | 144/34 E |
| 3,746,064 | 7/1973 | Blackburn | 144/339 |
| 3,805,860 | 4/1974 | Smith | 144/3 D |
| 3,886,985 | 6/1975 | Iarocci et al. | 144/339 |
| 4,050,488 | 9/1977 | Albright | 144/339 |

FOREIGN PATENT DOCUMENTS

| | | | |
|---|---|---|---|
| 1029283 | 11/1978 | Canada | 144/34 R |
| 604542 | 4/1978 | U.S.S.R. | 144/34 R |

OTHER PUBLICATIONS

*Plantation Machine Expanding Horizons*, Forest Industries, 1970.

*Primary Examiner*—W. D. Bray
*Attorney, Agent, or Firm*—Milton B. Graff, IV; John V. Gorman; Richard C. Witte

[57] ABSTRACT

Described herein is a vehicle-mounted tree harvesting machine. The tree harvesting machine includes a shear which cuts the trees and is arranged so that its cutting motion tends to direct the trees to fall by gravity into a bunching means in alignment with the shear. Once in the bunching means the cut trees are held there by a cantilevered bar. The harvesting vehicle then can move from cutting site to cutting site dragging the cut trees behind it. When the bunching means is full the cantilevered bar can be opened and the vehicle moved forward leaving the cut trees behind in a neat bunch.

17 Claims, 3 Drawing Figures

TREE FELLER WITH GRAVITATIONAL BUNCHER

This is a continuation of application Ser. No. 99,242, filed Dec. 3, 1979 now abandoned.

TECHNICAL FIELD

This invention relates to a tree felling and bunching device, particularly suitable for rapid harvesting of plantation forests.

BACKGROUND ART

In the past the direction in the tree felling art has been towards more and more complicated and enormous devices which of course have become quite expensive. The general scheme has been to use one or more pincer-like claws which simultaneously cut and hold a tree to be harvested both before and after cutting. Many of these massive devices are capable of cutting while holding several cut trees vertically. Representative of such devices are U.S. Pat. No. 4,050,488 issued to Albright on Sept. 27, 1977; U.S. Pat. No. 3,468,352 issued to Larson et al. on Sept. 23, 1969; U.S. Pat. No. 3,805,860 issued to Smith on Apr. 23, 1974; and U.S. Pat. No. 3,886,985 issued to Iarocci et al. on June 3, 1975.

Devices which cut trees one at a time and store them in a nonvertical configuration are also known. For example, U.S. Pat. No. 3,665,985 issued to White on May 30, 1972 describes a tree harvesting apparatus with a grappling front feeding shear which shears a grabbed tree and then wrestles it to a horizontal position alongside the vehicle. It is also known to store the cut trees atop the harvesting vehicle. For example, U.S. Pat. No. 3,528,468 issued Blonsky on Sept. 15, 1970 discloses a front feeding shear which shears a tree and then lifts and rotates it onto an overhead rack attached to the vehicle where the tree is stored in a horizontal configuration. It is also possible, according to Blonsky, to shear the trees and to allow them to fall by gravity onto the overhead rack. Another device with "on the vehicle" collection is described in an article entitled "Plantation Machine Expanding Horizons," by Richard W. Bryan in *Forest Industries Magazine*, September 1970. The article shows a harvesting machine which grabs and shears a tree with a grapple and a front feeding shear and then lifts and rotates it to a horizontal position on top of the vehicle where it is stored in a U-shaped trough. A holding arm rotates over the cut tree to hold it in position.

The deficiency common to these prior efforts is that they are relatively complex and therefore relatively expensive. It has long been a desire of those in the field of plantation harvesting especially in areas such as the Southern United States where the trees being harvested, such as pine trees, are generally less than 40 centimeters in diameter, to have a simple, economical feller-buncher which is easily adapted to vehicles commonly in use in tree harvesting operations.

DISCLOSURE OF THE INVENTION

This invention relates to a vehicle-mounted tree harvesting machine. The machine includes a means for felling trees one at a time and a means for bunching the felled trees. The means for felling trees urges the felled trees to fall by gravity away from the vehicle and into the buncher.

Also disclosed is a process for harvesting trees. The trees to be cut are approached by a harvesting vehicle. The trees are then felled one at a time with a vehicle mounted felling means and allowed to fall by gravity into a bunching means alongside the vehicle. The cut trees are dragged alongside the vehicle, at least partially supported by the ground in route to the next tree to be cut. Finally, the cut trees are formed into a bunch for collection.

DETAILED DESCRIPTION OF THE INVENTION

Figure 1:
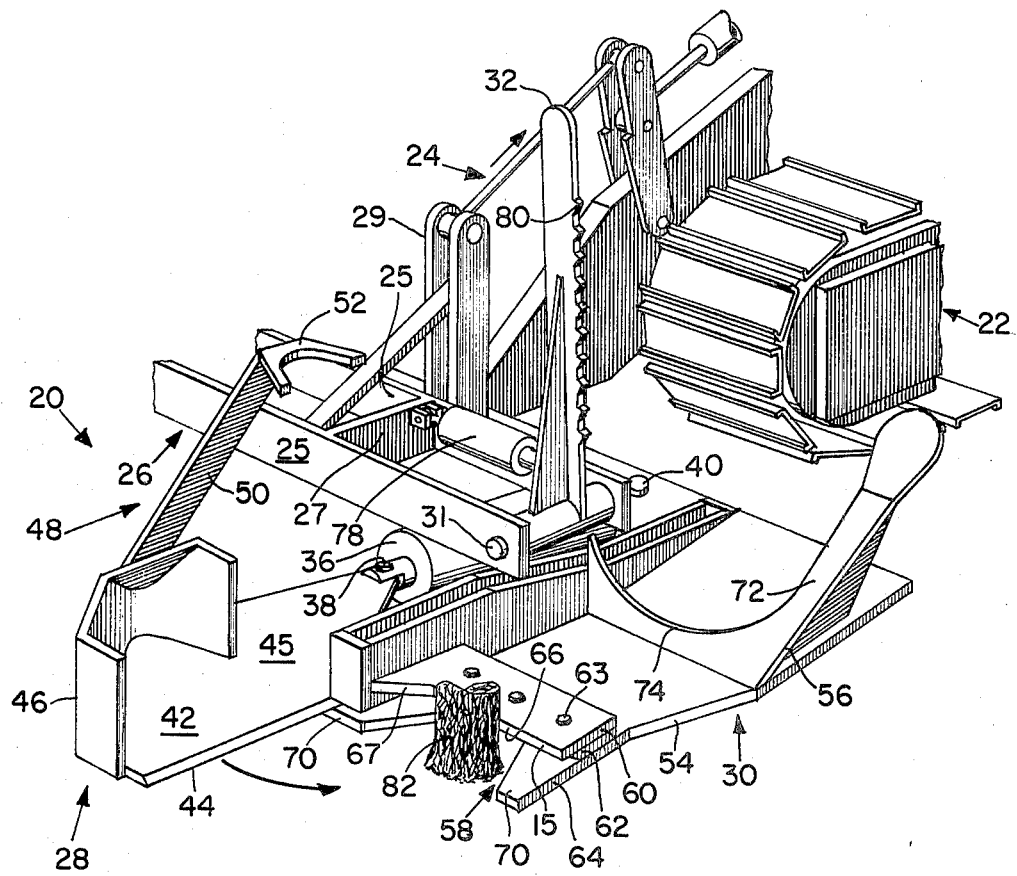
FIG. 1 is a perspective view of a vehicle-mounted feller-buncher with the viewer's left part of the vehicle and the top part of a tree to be felled, cut away for clarity.

Referring to the drawings wherein like reference characters are utilized for like parts throughout the several views, there is illustrated in FIG. 1 a vehicle-mounted feller-buncher 20. The tracked vehicle 22, only partially shown, which supports the vehicle-mounted feller-buncher 20 has two hydraulically operated members 24, only one of which is shown, which are capable of adjusting the distance of the feller-buncher 20 from the ground in use as well as during transportation. In addition, the hydraulically operated members 24 which are conventional with shovel-bearing vehicles, are also capable of rotating the feller-buncher 20 around an axis perpendicular to the direction of vehicle movement.

As used herein the terms "forward" and "rearward" refer to positions relative to the direction of movement of vehicle 22 as it advances on a tree to be cut, the vehicle moving from a "rearward" to a "forward" location.

The feller-buncher 20 includes a supporting rack 26, partially shown, a front feeding shear 28, and a bunching trough 30. As shown in FIG. 1, the supporting rack 26 which is mounted on the front of the vehicle 22 by means of hydraulic members 24 supports trough 30 which extends in front of and to one side of the vehicle 22 and which supports shear 28. The trough 30 also includes a cantilevered bunching beam 32 which is mounted directly on supporting rack 26.

The rack 26 extends across the front of the vehicle perpendicular to its direction of motion. The rack 26 includes two parallel elongate beams 25 connected by cross-members 27. Two pairs of upstanding posts 29, only one pair of which is shown, rigidly mounted to rack 26, provide the means for the articulate connection to the hydraulically operated members 24. Each hydraulic member 24 is connected to a pair of posts 29 at two spaced points in order to apply tonque to the pair of posts 29 which causes rack 26 to rotate around an axis perpendicular to the direction of vehicle movement. The rack 26 is lifted when both hydraulic members 24 apply an upward force to rack 26 via the spaced points of connection to posts 29. The cantilevered bunching beam 32 is mounted on rack 26 for rotation by means of pin 31 held between parallel elongate beams 25.

Figure 2:
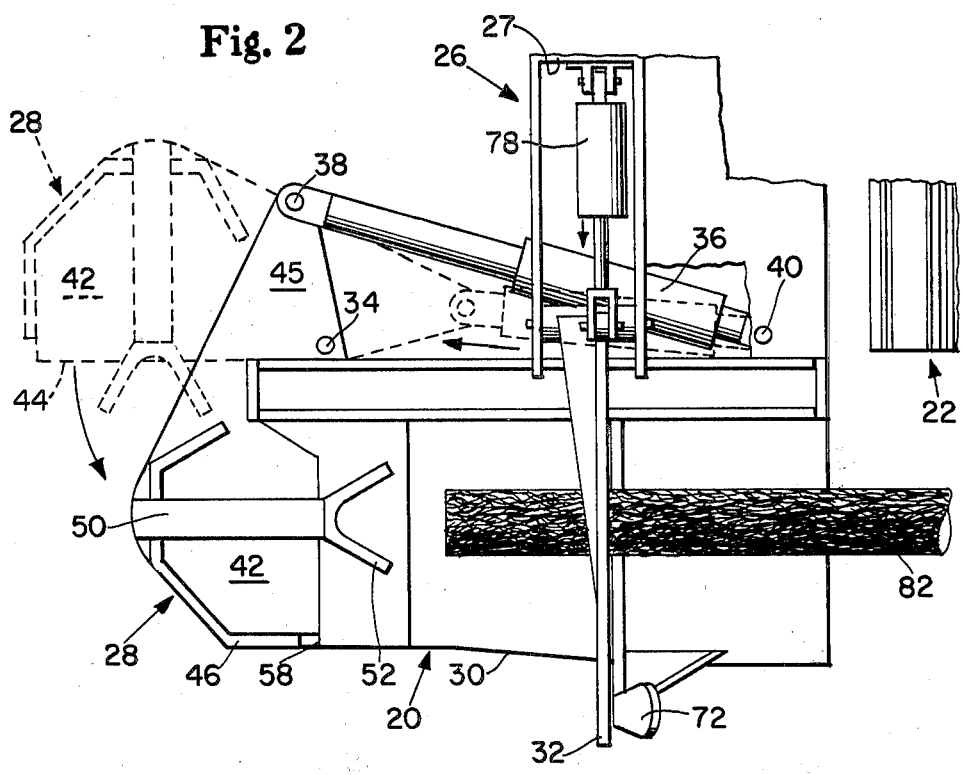
FIG. 2 is a fragmentary top plan view of the feller-buncher with its front feeding shear in the closed position and a felled tree in the bunching trough. The open position of the shear is shown in dotted lines.

Front feeding shear 28 rotates in a plane parallel to the ground around pin 34, shown in FIG. 2, from the open position shown in FIG. 1 and in dotted lines in FIG. 2 to the closed position shown in solid lines in FIG. 2. The movement of the shear 28 is effected by hydraulic cylinder 36 attached to the shear by the pin 38 spaced from pin 34. The other end of the cylinder 36 is attached to the rearward side of supporting rack 26 by a pin 40. Thus the cylinder 36 exerts torque on the shear 28 around pin 34. The attachment of the cylinder at points 38 and 40 allows pivoting of the cylinder around each point of attachment. To close the shear 28, (that is, to go from the position shown in dotted lines to the position shown in solid lines in FIG. 2 as indicated by arrows) the cylinder 36 expands causing it to move clockwise rotating the shear 28 90° counterclockwise around pin 34. Conversely, to open the shear 28, the cylinder 36 moves counterclockwise while contracting. Hydraulic cylinder 36 is conveniently a double acting cylinder with an 18 centimeter bore and a 15 centimeter rod.

Shear 28 includes a flat blade 42, a vertical guide 46 and a resilient pusher 48. The vertical guide 46 serves to reinforce the blade 42 and to prohibit forward movement of the cut tree butt. The resilient pusher 48 mounted on the vertical guide 46 further aids in directing the cut tree rearwardly towards the bunching trough 30.

The flat blade 42 has a cutting edge 44 and dog-ear shaped lever portion 45. The cutting edge 44 is shown beveled to make an acute angle with the lower surface of the blade although the edge 44 could be unbeveled or beveled at any desired angle. In the open position of the shear 28, the cutting edge 44 of the blade 42 is parallel to the direction of vehicle movement to allow "front feeding" of the tree to be felled, while in the closed position of the shear 28, the cutting edge 44 is generally perpendicular to the length of the vehicle, i.e. the direction of vehicle movement. The lever portion 45 of the blade 42 provides the leverage needed to allow reciprocating cylinder 36 to move shear 28 along a generally horizontal arcuate path to its closed position, shown in FIG. 2.

The resilient pusher 48 is mounted on shear 28 and includes an upstanding support 50 attached at one end to vertical guide 46, and a U-shaped guide bar 52 mounted on the other end of the upstanding support 50. The U-shaped guide bar 52 is arranged to generally conform to and thus engage a tree trunk above and spaced from the cutting edge 44 as the front feeding shear moves from the open to the closed position. More specifically it is preferred that the pusher 48 slope upwardly from vertical support 50 to a position where the center of U-shaped guide bar 52 is directly over the middle of edge 44 of the blade 42. The U-shaped guide bar 52 is resiliently mounted either by coil spring mounting at the point of attachment of the vertical support 50 to the vertical guide 46, by making the vertical support 50 a resilient leaf spring or by any other conventional technique. Thus the resilient pusher 48 is able to flex forwardly while exerting a rearward force against the tree trunk as the shear 28 moves rearwardly through the tree, until at some point toward completion of the cut, the force of the pusher 48 together with the action of blade 42 causes the tree to fall in the direction of the bunching trough 30.

Bunching trough 30, which supports shear 28, includes a horizontal bed 54, a J-shaped guide 56, and the cantilevered bunching beam 32. The J-shaped guide 56 is attached to the upper side of the central region of horizontal bed 54 adjacent the point of connection between rack 26 and trough 30.

Horizontal bed 54 includes at its forwardmost end an anvil 58. The anvil 58 is preferably arranged with its cutting face generally perpendicular to the direction of vehicle movement and the forward edge 44 of blade 42 in its open position but situated to abut flush against the cutting edge of blade 42 in the closed position of shear 28. The anvil 58 is made up of L-shaped coverplate 60, recessed anvil stop 62, and the forked end portion 64 of bed 54, all secured together by three spaced bolts 63 with recessed anvil stop 62 sandwiched between the coverplate 60 and the forked end portion 64. The coverplate 60 has a forward edge with a straight portion 66 and a flared portion 67. The straight portion 66 extends slightly forward of but parallel to the forward edge of recessed anvil stop 62. The forward edge of forked end portion 64 is V-shaped having two forward extending prongs 70 which extend forward of the forward edge of the recessed anvil stop 62 at a diverging angle with respect to each other and also forward of the straight portion 66 of the forward edge of the coverplate 60. The forward extending prongs 70 of the forked end portion 64 help to position the center of the anvil 58 against the tree in preparation for tree felling. When the front feeding shear 28 is in the closed position illustrated in FIG. 2, shear blade 42 is flush against recessed anvil stop 62 and is slightly overlapped by the straight portion 66 of the forward edge of anvil coverplate 60 and totally overlapping the forked end portion 64. This results in a cutting action between the cutting edge 44 of blade 42 and coverplate 60.

The J-shaped guide 56, located on the bed 54, has an upstanding arm 72 situated on the side of the horizontal bed away from the vehicle 22. The distance from the forward edge of the recessed anvil stop 62 to the J-shaped guide is conveniently from one third to two meters, the guide preferably situated so as to be between the felled tree's center of gravity and its cut end. The J-shaped guide 56 includes a tree supporting edge 74, shown as a beveled edge, located at the lowest point of the upper edge of guide 56. The tree supporting edge 74 is preferably at a height of about 10 to 30 centimeters above the anvil stop 62, most preferably about 15 centimeters.

In an embodiment not pictured, the tree supporting edge 74, where the felled trees tend to settle, is located towards or away from the rack 26 with respect to the point on the guide 56 which the trees are directed by the cutting motion of shear 28. The cut trees will tend to slide towards the low point of the guide because of the U-shape of the upper edge of guide 56. This will automatically index the already felled trees out of the way of subsequently felled trees by moving them in a direction out of the plane along which they rotate as they fall, away from the point where they initially impact the guide 56. The felled trees will still be arranged generally parallel to the direction of vehicle movement. Preferably the tree supporting edge is located about 10 centimeters or one tree diameter away from the point of initial impact of the felled trees. The tree supporting edge 74 is then sized to support the number of trees desired to be contained in each bunch. In the embodiment illustrated, the trees fall along a plane generally parallel to the direction of vehicle movement and thus to index the trees laterally away from their point of initial impact the edge 74 would be located along a line which intersects the line of vehicle movement.

Figure 3:
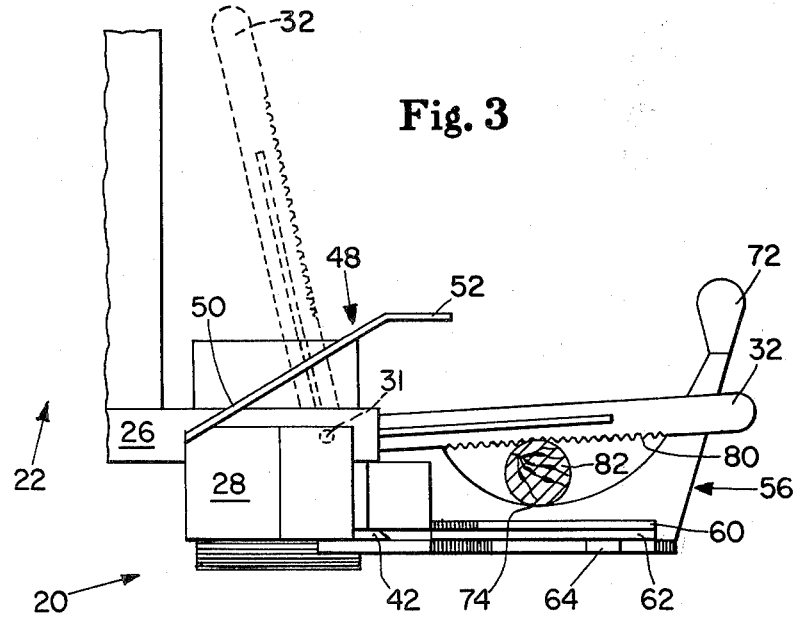
FIG. 3 is a fragmentary front elevational view of the feller-buncher mounted on a vehicle with its cantilevered bunching bar in the closed position and its front feeding shear in its open position and with a tree held in its bunching trough. The open position of the bunching bar is shown in dotted lines.

Cantilevered bunching beam 32 is mounted for rotation around pin 31 in a plane perpendicular to the direction of movement of vehicle 22 so that the beam 32 can open and close bunching trough 30 shown in the open position in FIG. 1 and in dotted lines in FIG. 3 and the closed position in solid lines in FIG. 3. The beam 32 is powered by a hydraulic cylinder 78 connected rotatably at a point a few centimeters above pin 31 at one end and rotatably connected on the other end to a crossmember 27 of rack 26. A double acting hydraulic cylinder with a ten centimeter bore and a four centimeter rod is suitable as the cylinder 78. In its open position, with the cylinder 78 contracted, the beam 32 extends upwardly and away from the upstanding arm 72 of J-shaped guide 56. Preferably both the open beam 32 and the upstanding arm 72 diverge away from each other as they extend upwardly. In its closed position, with the cylinder expanded as far as possible, the beam 32 passes forward of but in close adjacency to the lower portion of J-shaped guide 56 so that rearward force against beam 32 is supported in part by J-shaped guide 56. The beam 32 has spaced spikes 80 along the length of the side facing the guide 56 which bite into the felled tree to hold the felled tree on the guide 56.

Since the felled trees lie in trough 30 with their cut ends supported by tree supporting edge 74 and their tops extending off the trough 30 to be supported by the ground, a frictional force tending to pull the cut trees off the edge 74 is generated between the tree tops and the ground when the vehicle moves forward. This frictional force is counteracted by the cantilevered beam 32 when it is in its closed position and by the frictional force between the felled trees and the tree supporting edge 74 when the beam 32 is in its open, upright position. Because frictional force is a function of normal force, the frictional force created by the tree supporting edge 74 and also by the ground are a function of the placement of the edge 74 with respect to anvil 58 and of the height of edge 74. In general it is preferred that the tree supporting edge 74 be positioned close to anvil 58, resulting in a major portion of the weight of the felled trees being borne by the ground, thus generating a large frictional force between the tree tops and the ground when the vehicle moves. This insures that when the beam 32 is open, the frictional force between the trees and the edge 74 can be overcome and the felled trees pulled out of the trough 30 by moving the vehicle 22 forward.

The device operates as follows. A vehicle 22 with feller-buncher 20 mounted thereon approaches the tree 82 to be felled with the feller-buncher raised well off the ground. When the vehicle is closed to the tree, the vehicle mounted feller-buncher 20 is lowered, by means of hydraulically operated members 24, to a position at which the bed 54 of the bunching trough 30 is just off the ground. At this point the cantilevered bunching beam 32 is in its upward and open position and front feeding shear 28 is in its forward, open, position, shown in FIG. 1. The vehicle operator moves the feller-buncher 20 towards the tree until anvil cover plate 60 is flush against the tree 82, as shown in FIG. 1. Front feeding shear 28 is then operated so that blade 42 rotates counterclockwise, as indicated by the arrow in FIG. 1, around pin 34, passing through the tree 82 in a shearing motion towards anvil 58. The front-to-rear shearing motion through the tree tends to direct the tree rearwardly towards trough 30. The resilient pusher 48 applies a felling force to the tree aiding the tree's gravitational descent into bunching trough 30.

The tree 82 which is now cut clean through is guided into bunching trough 30 with the help of upstanding arm 72 of J-shaped guide 56 on one side and upstanding cantilevered bunching beam 32 on the other side. The tree lands with its cut end supported in an elevated position by tree supporting edge 74 of J-shaped guide 56. The tree supporting edge 74 acts like a fulcrum causing the tree to pivot about it as the tree falls. The edge 74 also creates a slight incline rearwardly away from shear 28 so that the cut end of the tree, as it pivots about edge 74, is urged to slide slightly rearwardly, carried by its own rearward momentum, from the point of shear and anvil abutment, insuring that previously cut trees do not interfere in the region of shear end anvil abutment with the subsequent cutting of additional trees. The cut tree then lies alongside and generally parallel to the length of the vehicle 22 and its direction of motion, with the upper portion of the tree supported by the ground.

Cantilevered bunching beam 32 is then closed atop the tree 82 sliding in front of upstanding arm 72 of J-shaped guide 56 until spikes 80 sink a short distance into the tree at their point of contact. Front feeding shear 28 is then returned to its open position shown in FIG. 3. Vehicle 22 now approaches the next tree to be felled. The first felled tree 82, dragged along side the vehicle, is held in position by the clamping force between cantilevered bunching beam 32, as transmitted by spikes 80, and J-shaped guide 56. If the felled tree originally landed at an angle to the direction of forward vehicle movement, it tends to become aligned with the direction of movement when it is dragged by the vehicle.

Feller-buncher 20 is again aligned with a tree to be felled, as shown in FIG. 1, and cantilevered bunching beam 32 is returned to its open position shown in dotted lines in FIG. 3. Any trees held in the bunching trough remain in position with their cut ends wedged off the ground by J-shaped guide 56. The cutting operation is performed as before and now two trees are held in bunching trough 30 by cantilevered bunching beam 32 in its closed position. These trees are dragged to the next cutting site. When the bunching trough 30 is full, the cantilevered bunching beam 32 is raised to its open position and the vehicle is moved forward. The cut trees pull out of trough 30 due to the frictional force between the tree tops and the ground. The bunched trees remain behind the vehicle mounted feller-buncher 20 in a neat pile. These trees can then easily be collected by conventional equipment.

While particular embodiments of the present invention have been illustrated and described, it will be obvious to those skilled in the art that various changes and modifications can be made without departing from the spirit and scope of the invention and it is intended to cover, in the appended claims, all such modifications that are within the scope of this invention.

What is claimed is:

1. A vehicle-mounted tree harvesting machine comprising:
   (a) bunching means for accumulating felled trees and including a trough adapted to support and selectively grip the cut ends of the trunks of said trees while the tree tops are supported by the ground, said bunching means being located adjacent one side of said vehicle;

(b) a front feeding shear mounted forward of said bunching means, said shear being supported for movement along a generally horizontal arcuate path from an open position to a closed position, said shear having a cutting edge adapted to cut through a tree as the shear moves towards the closed position, said cutting edge being generally perpendicular to the length of the vehicle in its closed position; and (c) pushing means mounted on said front feeding shear, said pushing means being adapted to engage a tree above and spaced from the cutting edge of said shear as it cuts through the tree and apply rearward force to initially direct the fall of such tree toward the trough of said bunching means, the tree thereafter completing the fall into said trough principally by gravity acting on such tree, said shear, said pushing means, and said bunching means being aligned so that the falling trees do not land on the vehicle.

2. The machine of claim 1 wherein said means for gripping the cut ends of the tree trunks being a cantilevered beam rotatable over said trough from a generally upright position alongside said trough.

3. The machine of claim 1 wherein said trough being positioned to insure that a sufficient portion of the weight of said trees is carried by the ground to develop a frictional force between the ground and the tree tops great enough to cause the felled trees to be pulled from said trough when said vehicle is moved forward and when the means to grip the cut ends of said trees is not in operation.

4. The machine of claim 1 wherein said bunching means includes means to urge said felled trees away from said severing means.

5. The bunching means of claim 4 wherein said urging means being a fulcrum spaced from said severing means and extending to a point higher than said severing means.

6. The machine of claim 1 wherein said pushing means is resilient and able to flex forwardly while exerting said rearward force against the tree as it is cut.

7. The machine of claim 6 wherein said resilient pushing means has a U-shaped guide for engaging the tree being cut, said guide being mounted on said shear by a support adapted to cause said guide to apply said rearward force against the tree trunk as the shear moves through the tree, until the force of said pushing means together with the action of said shear causes the tree to fall in the direction of said bunching means.

8. A vehicle-mounted tree harvesting machine adapted to be mounted on a vehicle comprising:

(a) a rack for mounting to said vehicle;

(b) bunching means mounted to said rack for accumulating cut trees and including a trough adapted to support and selectively grip cut ends of trunks of trees while tops are supported by the ground, said bunching means including said trough, being locatable adjacent one side of said vehicle when said machine is attached to said vehicle;

(c) a shear mounted to said rack forward of said bunching means, said shear being supported for movement along a generally horizontal arcuate path from an open forward position to a closed rearward position, said shear having a cutting edge adapted to cut through a tree as the shear moves toward the closed position, said cutting edge being generally rearwardly facing and perpendicular to the length of said vehicle in its closed position when said machine is attached to said vehicle; and (d) pushing means mounted for movement with respect to said rack, said pushing means being adapted to engage a tree trunk above and spaced from the cutting edge of said shear as it cuts through a tree trunk and generally simultaneously apply rearward force to initially direct the fall of a tree toward said trough of said bunching means and such a cut tree thereafter completing the fall into said trough principally by gravity acting thereon, said shear when closed and said pushing means when pushing a cut tree and said bunching means including said trough being aligned adjacent one side of said vehicle when said machine is attached to said vehicle so that a cut tree falls in said trough and lands adjacent one side of said vehicle.

9. The machine of claim 8 wherein said bunching means includes a cantilevered beam rotatable over said trough from a generally upright position alongside said trough.

10. The machine of claim 8 wherein said trough is positioned such that a sufficient portion of the weights of cut tree tops are supported by the ground to develop a frictional force between the ground and tree tops sufficiently to cause cut trees to be dragged from said trough when said vehicle to which said machine is attachable is moved forward and when said bunching means is operated to release cut trees from said trough.

11. The machine of claim 8 wherein said bunching means includes means to urge cut trees away from said shear.

12. The machine of claim 11 wherein said means to urge includes a fulcrum spaced from said shear and extending to a point higher than said shear.

13. The machine of claim 8 wherein said pushing means is resilient and flexes forwardly while exerting said rearward force against a tree as it is being cut by said shear.

14. The machine of claim 13 wherein said resilient pushing means includes a support member mounted on said shear and supporting a U-shaped guide above said shear for engaging a tree trunk being cut, said guide applying said rearward force against a tree trunk as said cutting edge moves therethrough until the force of said pushing means together with the action of said cutting edge causes a cut tree to fall in the direction of said trough.

15. The machine of claim 8 wherein said pushing means is mounted on said shear forwardly of said cutting edge when said shear is in its closed position.

16. The machine of claim 15 wherein said pushing means is resilient and flexes forwardly while exerting said rearward force against a tree as it is being cut by said shear.

17. The machine of claim 16 wherein said resilient pushing means includes a support member mounted on said shear and supporting a U-shaped guide above said shear for engaging a tree trunk being cut, said rearward force against a tree trunk as said cutting edge moves therethrough until the force of said pushing means together with the action of said cutting edge causes a cut tree to fall in the direction of said trough.

* * * * *

UNITED STATES PATENT AND TRADEMARK OFFICE
CERTIFICATE OF CORRECTION

PATENT NO. : 4,407,343
DATED : October 4, 1983
INVENTOR(S) : Harry E. Brown

It is certified that error appears in the above-identified patent and that said Letters Patent is hereby corrected as shown below:

Column 1, line 35, after "issued" insert -- to --.

Column 2, line 63, "tonque" should read -- torque --.

Column 4, line 9, "cutting" should read -- forward --.

Column 4, line 10, "forward" should read -- cutting --.

Column 5, line 56, "closed" should read -- close --.

Signed and Sealed this

Sixth Day of December 1983

[SEAL]

Attest:

Attesting Officer

GERALD J. MOSSINGHOFF

Commissioner of Patents and Trademarks